(12) United States Patent
Fang et al.

(10) Patent No.: US 10,667,364 B2
(45) Date of Patent: May 26, 2020

(54) LAMP DIMMING CIRCUIT WITH ELECTRICITY LEAKAGE PREVENTING FUNCTION

(71) Applicants: Self Electronics Co., Ltd., Ningbo, Zhejiang (CN); Wanjiong Lin, Zhejiang (CN); Self Electronics USA Corporation, Norcross, GA (US)

(72) Inventors: Junqi Fang, Zhejiang (CN); Junjun Ying, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 16/460,175

(22) Filed: Jul. 2, 2019

(65) Prior Publication Data

US 2020/0015337 A1  Jan. 9, 2020

(30) Foreign Application Priority Data

Jul. 6, 2018 (CN) .......................... 2018 1 0735756

(51) Int. Cl.
*H05B 33/08* (2020.01)
*H05B 45/50* (2020.01)
*H05B 45/37* (2020.01)

(52) U.S. Cl.
CPC ............. *H05B 45/50* (2020.01); *H05B 45/37* (2020.01)

(58) Field of Classification Search
CPC ............ H05B 33/0815; H05B 33/0839; H05B 33/0845; H05B 33/0851

USPC .................................................. 315/297, 307
See application file for complete search history.

(56) References Cited

U.S. PATENT DOCUMENTS

| | | | |
|---|---|---|---|
| 10,368,407 B2 * | 7/2019 | Luccato | H05B 47/11 |
| 2012/0262080 A1 * | 10/2012 | Watanabe | H05B 33/0818 315/210 |
| 2012/0262082 A1 * | 10/2012 | Esaki | H05B 33/0848 315/224 |
| 2013/0300310 A1 * | 11/2013 | Hu | H05B 33/0854 315/239 |
| 2014/0152183 A1 * | 6/2014 | Kim | H05B 33/0809 315/155 |
| 2015/0015156 A1 * | 1/2015 | Angelin | H02M 3/33507 315/210 |
| 2017/0171928 A1 * | 6/2017 | Lee | H02M 3/33523 |
| 2019/0069363 A1 * | 2/2019 | Wang | H05B 45/10 |

* cited by examiner

Primary Examiner — Tung X Le
(74) Attorney, Agent, or Firm — Wang Law Firm, Inc.

(57) ABSTRACT

The invention relates to a lamp dimming circuit with electricity leakage preventing function, includes a power module, a PWM signal conversion module, an optocoupler, an analog signal conversion module, and a controller and a voltage conversion module for connecting the illuminator. By adding the PWM signal conversion module, optocoupler and analog signal conversion module, the external dimming input signals in turn converted into PWM modulation signal, optical signal and analog voltage signal, and transferring the converted analog voltage signal to the controller for processing, and the controller sends the processed signal to the voltage conversion module for processing. Since the voltage signal entering the optocoupler is transmitted in the form of light, and there is no Y capacitor crossover between the power line and the dimming line.

3 Claims, 3 Drawing Sheets

LAMP DIMMING CIRCUIT WITH ELECTRICITY LEAKAGE PREVENTING FUNCTION

RELATED APPLICATION

This application claims priority to a Chinese Patent Application No. CN 201810735756.9, filed on Jul. 6, 2018.

FIELD OF THE TECHNOLOGY

The present invention relates to dimming lamps field, with particular emphasis on a lamp dimming circuit with electricity leakage preventing function.

BACKGROUND OF THE INVENTION

With the rapid development of LED technology, its luminous efficiency has gradually increased, and the LED application market has become more extensive. Especially in the context of the global energy shortage worry, the prospect of LED in the lighting market has attracted worldwide attention. The gradual maturity of intelligent lighting technology has enabled more and more companies to intervene in this field. Major companies have made their own dimming fixtures, and the schemes used are various.

FIG. 1 shows the traditional lamp dimming circuit used in most enterprises. The traditional lamp dimming circuit mainly includes power module, dimming controller, microcontroller, dimmer and LED lamp. The power module, dimming controller and the microcontroller will have a grounding point correspondingly; the power module is span connected to the dimming controller through a Y capacitor, and another Y capacitor is also disposed between the dimming controller and the microcontroller, and the microcontroller is connected with the dimmer, and the dimming controller is connected to the LED light. Thus, part of the common mode interference is eliminated by the Y capacitor span connecting between the power module and the dimming controller, the dimming controller and the microcontroller. At the same time, the electricity leakage current of the Y capacitor flows through the three grounding points. If the number of interconnected lamps increases, a large electricity leakage current will flow through the dimming circuit of the lamp dimming circuit, which may cause electric shock.

BRIEF SUMMARY OF THE INVENTION

The technical problem to be solved by the present invention is to provide a lamp dimming circuit with electricity leakage preventing function for the above prior art.

The technical solution adopted by the present invention to solve the above technical problem is:

A lamp dimming circuit with electricity leakage prevention function includes a power module, characterized in that it further includes a PWM signal conversion module, an optocoupler, an analog signal conversion module, and a controller and a voltage conversion module for connecting the illuminator; the PWM signal conversion module has a signal input end for acquiring a dimming input signal; a Y capacitor is disposed between the power module and the PWM signal conversion module, the power module is connected to one end of the Y capacitor, and the other end of the Y capacitor is connected to the PWM signal conversion module; the signal output end of the PWM signal conversion module is connected to the signal input end of the optocoupler, and the signal output end of the optocoupler is connected to the signal input end of the analog signal conversion module, and the signal output end of the analog signal conversion module is connected to the controller; the controller is connected to the voltage conversion module, and the voltage conversion module has a dimming signal output end for outputting a dimming signal to the illuminant;

the PWM signal conversion module is configured to acquire a dimming input signal and convert the dimming input signal into a PWM modulated signal;

the analog signal conversion module is configured to convert an output signal of the optocoupler into an analog signal.

advantageously, a first function relationship is satisfied between the dimming input signal and the output signal of PWM signal conversion module, and a second functional relationship is satisfied between the output signal of PWM signal conversion module and the output signal of analog signal conversion module.

advantageously, the power module is connected to the power line of the mains supply.

advantageously, the dimming input signal is a 1-10V voltage signal.

advantageously, the illuminant is an LED lamp.

advantageously, the controller is a microcontroller; or/and, in the lamp dimming circuit, the duty ratio of the PWM signal converted by the PWM signal conversion module 2 ranges from 10% to 100%.

the lamp dimming circuit is applied to dimming lamp, and the dimming lamp includes a illuminant connected to the mains supply, and the dimming signal output end of the voltage conversion module in the lamp dimming circuit is connected to the illuminant.

The advantages of the present invention over the prior art are:

First, in the lamp dimming circuit of the present invention, by adding the PWM signal conversion module, optocoupler and analog signal conversion module, the external dimming input signals in turn converted into PWM modulation signal, optical signal and analog voltage signal, and transferring the converted analog voltage signal to the controller for processing, and the controller sends the processed signal to the voltage conversion module for processing, so that the dimming output signal output by the voltage conversion module and the previous dimming input signal remains synchronized. Since the voltage signal entering the optocoupler is transmitted in the form of light, and there is no Y capacitor crossover between the power line and the dimming line, in this way, there is no electricity leakage current flow in the optocoupler, and there is no risk of electric shock in the corresponding dimming line, so that after the lamp dimming circuit is connected in series to the L line and the N line of the power line and the lamp, the optocoupler provided in the dimming circuit is used to avoid the risk of electricity leakage when interconnecting the lamps, to achieve the function of preventing electricity leakage of lamps;

Secondly, the lamp dimming circuit of the present invention has a simple structure, is easy to apply and connected to the existing interconnected lamps, thereby effectively avoiding the electricity leakage potential of the existing lamp products.

DETAILED DESCRIPTION OF THE INVENTION

The present application is illustrated by way of the following detailed description based on of the accompanying drawings. It should be noted that illustration to the embodiment in this application is not intended to limit the invention.

Figure 1:
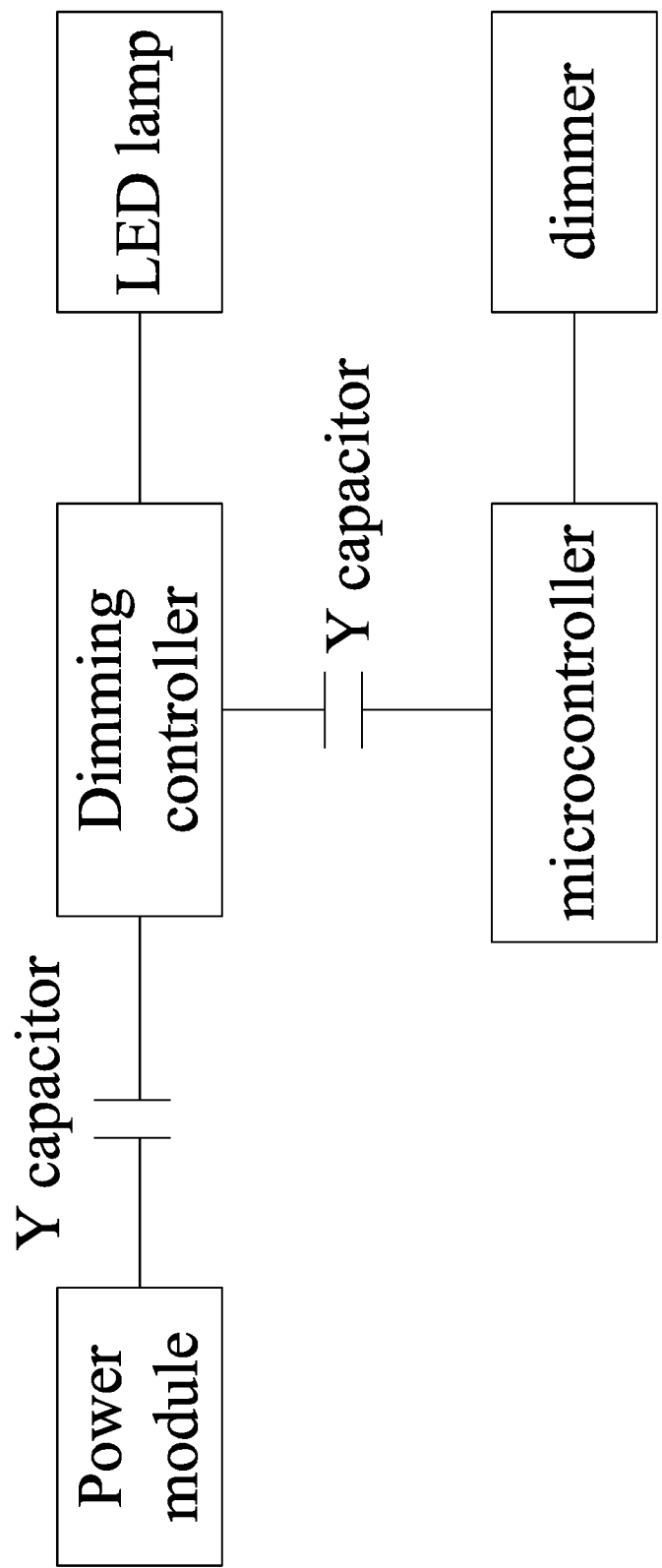
FIG. 1 is a schematic diagram of a traditional lamp dimming circuit.
Figure 2:
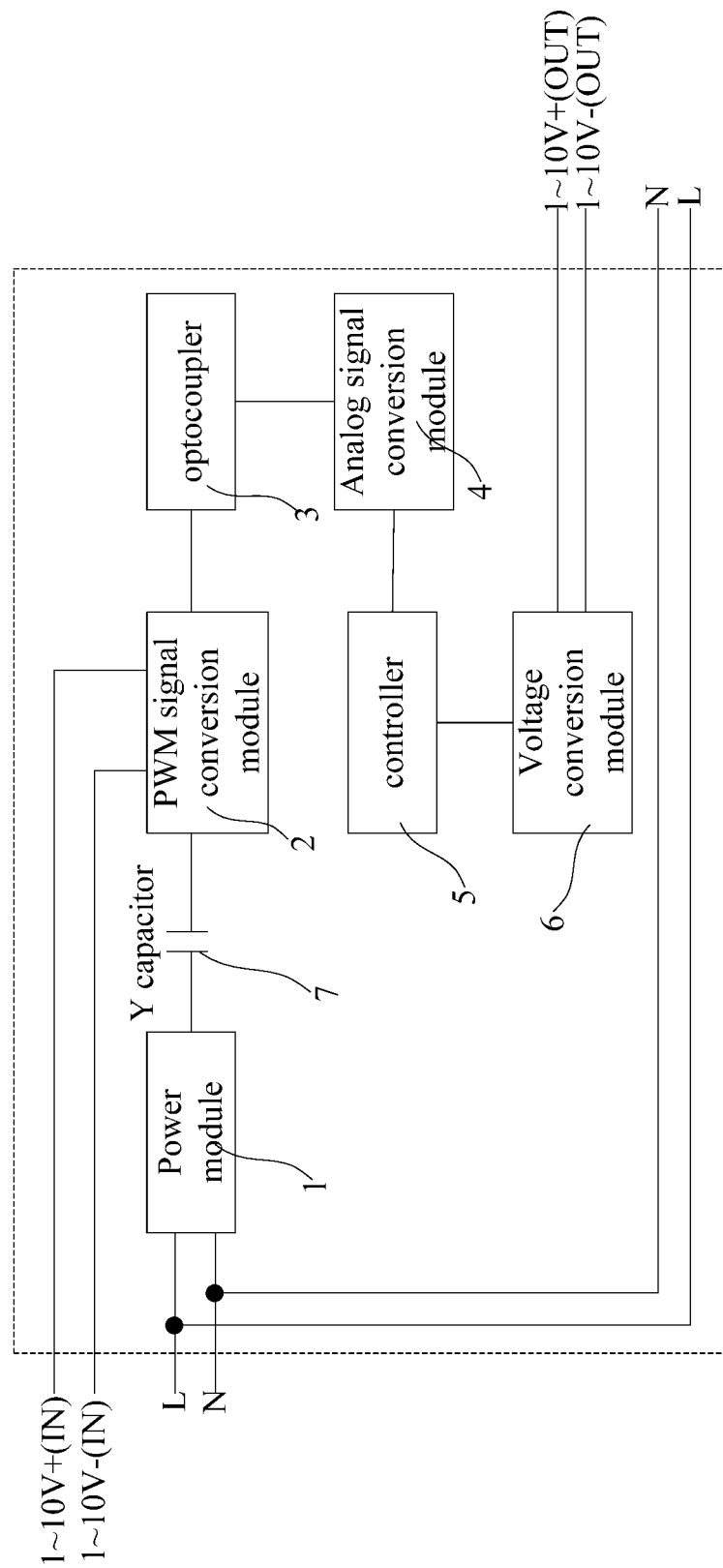
FIG. 2 is a schematic diagram of a lamp dimming circuit with electricity leakage preventing function in the embodiment (inside the dotted line frame)

As shown in FIG. 2, the lamp dimming circuit with electricity leakage prevention function in the embodiment includes a power module 1, a PWM signal conversion module 2, an optocoupler 3, an analog signal conversion module 4, a controller 5, and a voltage conversion module 6 for connecting the illuminant. The PWM signal conversion module 2 has a signal input end for acquiring a dimming input signal; the PWM signal conversion module 2 is configured to acquire the dimming input signal and convert the dimming input signal into a PWM modulated signal; wherein, the PWM modulation signal is a pulse width modulation signal; the analog signal conversion module 4 is configured to convert the output signal of the optocoupler 3 into an analog signal; and the illuminant to which the voltage conversion module 6 is connected is preferably an LED lamp. In this embodiment, specifically, a Y capacitor 7 is disposed between the power module 1 and the PWM signal conversion module 2, the power module 1 is connected to one end of the Y capacitor 7, and the other end of the Y capacitor 7 is connected to the PWM signal conversion module 2. Therefore, the power module and the PWM signal conversion module 2 are span connected; the power module 1 supplies power to the PWM signal conversion module 2 through the Y capacitor 7; the signal output end of the PWM signal conversion module 2 is connected to the signal input end of the optocoupler 3. The signal output end of the optocoupler 3 is connected to the signal input end of the analog signal conversion module 4, and the signal output end of the analog signal conversion module 4 is connected to the controller 5. The controller 5 is connected to the voltage conversion module 6. The voltage conversion module 6 has a dimming signal output end for outputting a dimming signal to the illuminant. Wherein, the controller 5 in this embodiment can use a microcontroller as needed; the power module 1 is connected to the power line (L, N) of the mains supply. The signal in the optocoupler 3 is transmitted in the form of an optical signal in which no signal in the form of current is present. By satisfying a functional relationship between the dimming input signal and the signal output end of the optocoupler 3, it ensures that the dimming output signal processed by PWM signal conversion module 2 and voltage conversion module is synchronized with the dimming input signal which is input into the lamp dimming circuit. The dimming input signal in the lamp dimming circuit of this embodiment is a 1-10V voltage signal. According to the dimming requirements for the lamp, the duty ratio of the PWM signal converted by the PWM signal conversion module 2 in this embodiment is set to be 10% to 100%.

Now, after the lamp dimming circuit in this embodiment is connected in series to the L line and N line of the power line and the lamp, the principle of preventing electricity leakage is explained as follows:

After the lamp dimming circuit is connected with the external illuminant, the PWM signal conversion module 2 collects an external dimming input signal of 1-10V, and then converts the dimming input signal into PWM modulation signal with corresponding duty ratio. The PWM modulation signal is emitted through the signal input end of the optocoupler 3. The signal in the optocoupler 3 is not in the form of current, but is transmitted to the signal output end of the optocoupler 3 in the form of optical signal; the signal output end of the optocoupler 3 is PWM signal of shaping, the PWM signal after shaping is converted into a voltage signal in the form of an analog signal by the analog signal conversion module 4 and transmitted to the controller 5. The controller 5 correspondingly outputs another PWM signal to the voltage conversion module 6 by taking advantage of the functional relationship among the previous dimming input signal, the output signals of the PWM signal conversion module 2 and the analog signal conversion module 4. And the voltage conversion module 6 outputs a dimming output signal synchronized with the previous 1-10V dimming input signal. The first functional relationship is satisfied between the dimming input signal and the output signal of the PWM signal conversion module 2, and the second functional relationship is satisfied between the output signal of the PWM signal conversion module 2 and the output signal of the analog signal conversion module 4. Both the first functional relationship and the second functional relationship can be obtained by means of point fitting.

Since the voltage signal entering the optocoupler 3 is transmitted in the form of optical signal, and there is no Y capacitor crossover between the power line and the dimming line, there is no electricity leakage current flow in the optocoupler, and there will be no electric shock risk in the corresponding dimming line, so after the lamp dimming circuit is connected in series to the L line, N line of the power line and the lamp, since there is no current in the optocoupler 3, the current loop will not be formed. Thus, by adding optocoupler in the dimming circuit to avoid the risk of electricity leakage when interconnecting the lamps, and achieve the function of preventing electricity leakage of the lamp.

Figure 3:
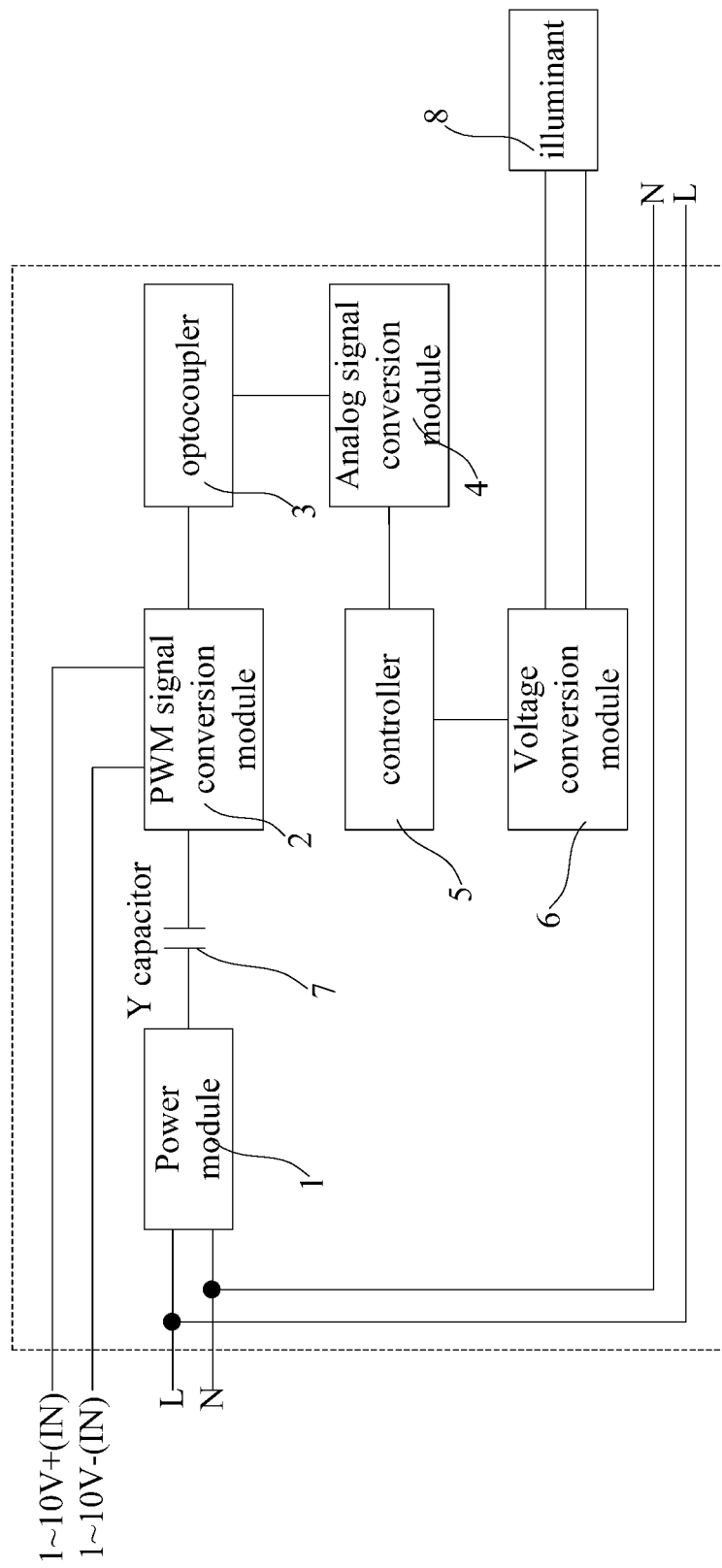
FIG. 3 is a schematic diagram showing the connection of main components in a dimming lamp with electricity leakage preventing function in the embodiment.

As shown in FIG. 3, the lamp dimming circuit is applied to dimming lamp, and the dimming lamp includes a illuminant 8 connected to the mains supply, and the dimming signal output end of the voltage conversion module 6 in the lamp dimming circuit is connected to the illuminant 8. As shown in FIG. 3, the embodiment further provides a dimming lamp with electricity leakage preventing function, the dimming lamp includes an illuminant 8 connected to commercial power source and the lamp dimming circuit in the embodiment, and the dimming signal output of the voltage conversion module 6 in the lamp dimming circuit is connected to the illuminant 8. The illuminant 8 in this embodiment is an LED lamp.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:

1. A lamp dimming circuit for an illuminator with electricity leakage prevention function comprising:
   a power module;

a PWM signal conversion module;
an optocoupler;
an analog signal conversion module;
a controller; and
a voltage conversion module for connecting to the illuminator,
wherein
 the PWM signal conversion module has a signal input end for a dimming input signal,
 a Y capacitor is disposed between the power module and the PWM signal conversion module,
 the power module is connected to one end of the Y capacitor, and other end of the Y capacitor is connected to the PWM signal conversion module,
 a signal output end of the PWM signal conversion module is connected to a signal input end of the optocoupler, and a signal output end of the optocoupler is connected to a signal input end of the analog signal conversion module, and a signal output end of the analog signal conversion module is connected to the controller,
 the controller is connected to the voltage conversion module,
 the voltage conversion module has a dimming signal output end for outputting a dimming signal to the illuminator,
 the PWM signal conversion module is configured to acquire the dimming input signal and convert the dimming input signal into a PWM modulated signal, and
 the analog signal conversion module is configured to convert an output signal of the optocoupler into an analog signal.

2. The lamp dimming circuit as claimed in claim 1, wherein a first function relationship is satisfied between the dimming input signal and the output signal of PWM signal conversion module, and a second functional relationship is satisfied between the output signal of PWM signal conversion module and the output signal of analog signal conversion module.

3. The lamp dimming circuit as claimed in claim 1, wherein the power module is connected to the power line (L, N) of the mains supply.

* * * * *